United States Patent
Gassho et al.

(10) Patent No.: US 7,224,477 B2
(45) Date of Patent: May 29, 2007

(54) PRINTER AND PRINTING SYSTEM CAPABLE OF HIGH SECRET PRINTING

(75) Inventors: Kazuhito Gassho, Nagano-Ken (JP); Haruo Tsurumaki, Nagano-Ken (JP); Susumu Shiohara, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 808 days.

(21) Appl. No.: 09/934,678

(22) Filed: Aug. 23, 2001

(65) Prior Publication Data
US 2002/0032703 A1 Mar. 14, 2002

(30) Foreign Application Priority Data
Aug. 28, 2000 (JP) ............... 2000-257833
Aug. 22, 2001 (JP) ............... 2001-251463

(51) Int. Cl.
*G06K 15/00* (2006.01)
*G06F 3/12* (2006.01)

(52) U.S. Cl. ............... 358/1.14; 358/1.13; 358/1.15; 358/1.16

(58) Field of Classification Search ............... 358/1.14, 358/1.16, 1.15, 1.13, 1.17, 1.1, 404, 444, 358/468, 407
See application file for complete search history.

(56) References Cited

U.S. PATENT DOCUMENTS

| | | | | |
|---|---|---|---|---|
| 5,638,511 A | * | 6/1997 | Nezu | 726/5 |
| 5,673,373 A | * | 9/1997 | Nosaki et al. | 358/1.15 |
| 6,089,765 A | * | 7/2000 | Mori | 400/61 |
| 6,160,629 A | * | 12/2000 | Tang et al. | 358/1.1 |
| 6,583,886 B1 | | 6/2003 | Ochiai | |

FOREIGN PATENT DOCUMENTS

| | | |
|---|---|---|
| JP | 4-75128 A | 3/1992 |
| JP | 4-364971 A | 12/1992 |
| JP | 5-143250 A | 6/1993 |
| JP | 6-124177 A | 5/1994 |
| JP | 7-149000 A | 6/1995 |
| JP | 7-152520 A | 6/1995 |
| JP | 8-39898 A | 2/1996 |
| JP | 11-331454 A | 11/1999 |
| JP | 2000-293338 A | 10/2000 |
| JP | A 2000-289298 | 10/2000 |

OTHER PUBLICATIONS

Abstract of Japanese Patent Publication No. 10-336375, Pub. Date: Dec. 18, 1998, Patent Abstracts of Japan.
Abstract of Japanese Patent Publication No. 11-053130, Pub. Date: Feb. 26, 1999, Patent Abstracts of Japan.
Abstract of Japanese Patent Publication No. 11-249848, Pub. Date: Sep. 17, 1999, Patent Abstracts of Japan.

* cited by examiner

*Primary Examiner*—Dov Popovici
(74) *Attorney, Agent, or Firm*—Martine Penilla & Gencarella, LLP (57) ABSTRACT

When a printer (30) prints a printing job of confidential printing which is a kind of printing of secret documents, even if the printer (30) itself is set to hold printing job data after printing, the printing job data are deleted without being held in a hard disk (32) after printing. Consequently, secrecy on the occasion of printing with some secret such as confidential printing can be heightened.

14 Claims, 12 Drawing Sheets

PRINTER AND PRINTING SYSTEM CAPABLE OF HIGH SECRET PRINTING

BACKGROUND OF THE INVENTION

1. Field of the Invention

The present invention relates to a printer and a printing system, and more particularly to a printer and a printing system suitable for printing a printing job having some secret.

2. Description of the Related Art

These days, a printing system in which a printer is shared by means of a network has been increasingly used. Namely, by connecting a plurality of computers as clients to one network and connecting, for example, one printer to this network, one printer can receive printing jobs from the plurality of clients and perform printing.

In the printing system using this network, there is a certain distance between the clients and the printer in some cases, and hence a function of confidential printing is supported providing against a case where a printing job with some secret which others are not permitted to look at is printed.

In this confidential printing, when a user transmits a printing job from the client to the printer, for example, confidential attribute information indicating confidential printing, user information and a password are added thereto. The printer which has received this printing job does not immediately start printing based on this printing job, but temporarily saves it as printing job data in a hard disk. When the user comes to the printer and inputs right user information and password from an operation panel of the printer, the printer reads the printing job data out of the hard disk and starts printing. This prevents the printing result of the printing job to be seen by others before the user which has transmitted the printing job arrives at the printer.

In printers supporting such a function of confidential printing, there is a printer which can be set to still hold the printing job in the hard disk after printing. Namely, there is a printer which can be set to save the printing job in the hard disk so that even the printing job which has been printed can be printed again at the request of the user. After a lapse of a given period of time or when a given amount of printing jobs are held, the printing jobs are deleted in sequence from the hard disk.

When the aforesaid confidential printing is performed by the printer having such a hold function, even a printing job of secret confidential printing is held as printing job data in the hard disk after printing is completed. In this case, it can not be said that there is no possibility that a third person with dishonest intentions looks surreptitiously at the printing job data, which has been already printed but still held in the hard disk, forcibly by some means.

SUMMARY OF THE INVENTION

The present invention is made in view of the aforesaid problem, and an object of the present invention is to provide a printer and a printing system which do not hold a printing job having some secret in an auxiliary memory device such as a hard disk or the like even when, in the case of a printer with the function of holding a printing job after printing, the printer itself is set to hold the printing job after printing.

In order to accomplish the aforementioned and other objects, according to one aspect of the present invention, a printer, comprising:

a set portion in which whether or not a received printing job is held as printing job data in an auxiliary memory device even after printing of the received printing job is completed is set not for each printing job but comprehensively, this comprehensive setting being allowed to be performed from a client via a network;

a judging portion which judges whether the received printing job is set to have some secret or not; and a selective holder which refrains from holding the printing job as printing job data in the auxiliary memory device even if the set portion is set so that the printing job is still held as printing job data in the auxiliary memory device even after printing is completed, when the judging portion judges that the printing job is set to have some secret, and holds the printing job as printing job data in the auxiliary memory device when the judging portion judges that the printing job is not set to have some secret and the set portion is set so that the printing job is still held as printing job data in the auxiliary memory device even after printing is completed.

According to another aspect of the present invention, a printer controlling method, comprising the steps of:

performing comprehensive setting for a set portion from a client via a network, whether or not a received printing job is held as printing job data in an auxiliary memory device even after printing of the received printing job is completed being set not for each printing job but comprehensively in the set portion;

judging whether the received printing job is set to have some secret or not;

refraining from holding the printing job as printing job data in the auxiliary memory device even if the set portion is set so that the printing job is still held as printing job data in the auxiliary memory device even after printing is completed when it is judged that the printing job is set to have some secret in the step of judging; and holding the printing job as printing job data in the auxiliary memory device when it is judged that the printing job is not set to have some secret in the step of judging and the set portion is set so that the printing job is held as printing job data in the auxiliary memory device even after printing is completed.

According to a further aspect of the present invention, a program which causes a printer to execute the steps of:

performing comprehensive setting for a set portion from a client via a network, whether or not a received printing job is held as printing job data in an auxiliary memory device even after printing of the received printing job is completed being set not for each printing job but comprehensively in the set portion;

judging whether the received printing job is set to have some secret or not;

refraining from holding the printing job as printing job data in the auxiliary memory device even if the set portion is set so that the printing job is still held as printing job data in the auxiliary memory device even after printing is completed when it is judged that the printing job is set to have some secret in the step of judging; and holding the printing job as printing job data in the auxiliary memory device when it is judged that the printing job is not set to have some secret in the step of judging and the set portion is set so that the printing job is still held as printing job data in the auxiliary memory device even after printing is completed.

According to a still further aspect of the present invention, a record medium on which a program is recorded, the program causing the printer to execute the steps of:

performing comprehensive setting for a set portion from a client via a network, whether or not a received printing job is held as printing job data in an auxiliary memory device even after printing of the received printing job is completed being set not for each printing job but comprehensively in the set portion;

judging whether the received printing job is set to have some secret or not;

refraining from holding the printing job as printing job data in the auxiliary memory device even if the set portion is set so that the printing job is still held as printing job data in the auxiliary memory device even after printing is completed when it is judged that the printing job is set to have some secret in the step of judging; and holding the printing job as printing job data in the auxiliary memory device when it is judged that the printing job is not set to have some secret in the step of judging and the set portion is set so that the printing job is held as printing job data in the auxiliary memory device even after printing is completed.

According to a still further aspect of the present invention, a printing system in which a plurality of clients and at least one printer are connected via a network, wherein the client comprises a transmitter which sets a printing job to have some secret and transmits the printing job to the printer via the network, and wherein the printer comprises:

a set portion in which whether or not a received printing job is held as printing job data in an auxiliary memory device even after printing of the received printing job is completed is set not for each printing job but comprehensively, this comprehensive setting being allowed to be performed from the client via the network;

a judging portion which judges whether the received printing job is set to have some secret or not; and a selective holder which refrains from holding the printing job as printing job data in the auxiliary memory device even if the set portion is set so that the printing job is still held as printing job data in the auxiliary memory device even after printing is completed when the judging portion judges that the printing job is set to have some secret, and holds the printing job as printing job data in the auxiliary memory device when the judging portion judges that the printing job is not set to have some secret and the set portion is set so that the printing job is still held as printing job data in the auxiliary memory device even after printing is completed.

According to a still further aspect of the present invention, a method for controlling a printing system in which a plurality of clients and at least one printer are connected via a network, comprising the steps of:

performing comprehensive setting for a set portion from the client via the network, whether or not a received printing job is held as printing job data in an auxiliary memory device even after printing of the received printing job is completed is set not for each printing job but comprehensively in the set portion;

setting the printing job to have some secret and transmitting the printing job from one of the clients to the printer via the network;

judging whether the printing job received in the printer is set to have some secret or not;

refraining from holding the printing job as printing job data in the auxiliary memory device even if the set portion is set so that the printing job is still held as printing job data in the auxiliary memory device even after printing is completed when it is judged that the printing job is set to have some secret in the step of judging; and holding the printing job as printing job data in the auxiliary memory device when it is judged that the printing job is not set to have some secret in the step of judging and the set portion is set so that the printing job is still held as printing job data in the auxiliary memory device even after printing is completed.

DESCRIPTION OF THE PREFERRED EMBODIMENTS

[First Embodiment]

When receiving a printing job of confidential printing, a printer according to the first embodiment of the present invention is designed not to hold this printing job in a hard disk even when the printer is set to hold data on the printing job in the hard disk after printing is completed. This will be explained below in more detail.

Figure 1:
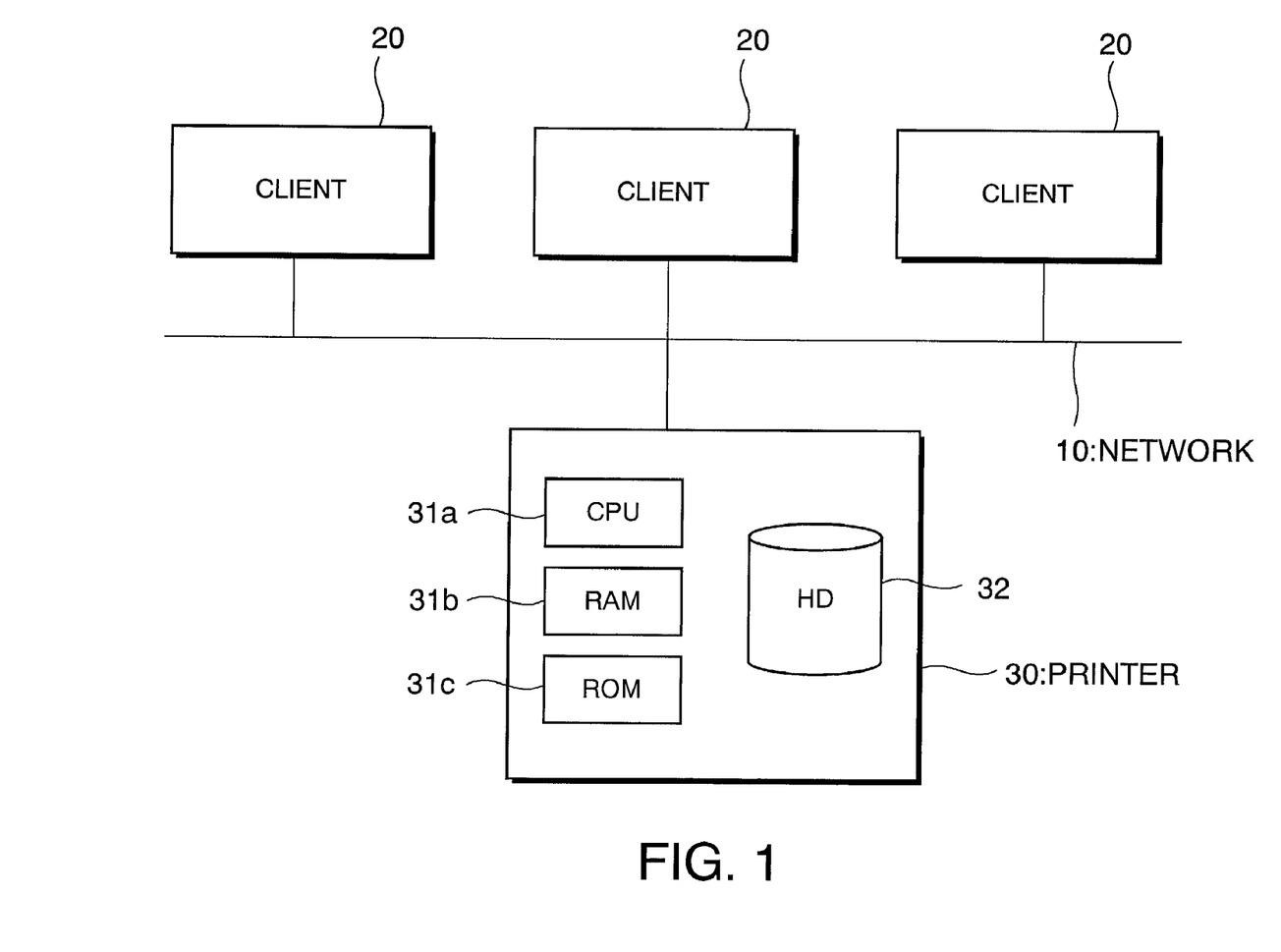
FIG. 1 is a diagram showing an example of a hardware configuration of a printing system according to a first embodiment of the present invention.

First, the configuration of a printing system according to this embodiment will be explained based on FIG. 1. FIG. 1 is a block diagram showing a hardware configuration of the printing system according to this embodiment.

As shown in FIG. 1, the printing system according to this embodiment comprises a plurality of clients 20, 20, and 20 connected to a network 10 and one printer 30 also connected to the network 10. The client 20 is any one of various computers called a host computer, a personal computer, and the like, and in this embodiment it is a computer especially to generate a printing job and transmit this printing job to the printer 30 via the network 10.

In this embodiment, the printer 30 is a so-called network printer and comprises a CPU (Central Processing Unit) 31a, a RAM (Random Access Memory) 31b, a ROM (Read Only Memory) 31c, and a hard disk 32.

In this printer 30, the printing job received from the network 10 is temporarily stored as printing job data in the hard disk 32. This hard disk 32 is contained in the printer 30 in this embodiment, but it may be attached to the outside of the printer 30 or provided separately via the network 10. The hard disk 32 composes an auxiliary memory device in this embodiment.

The printer 30 which has received the printing job which is not confidential printing generates a printing request from printing job data to perform printing according to the state of use of a printer engine provided in the printer 30. Namely, the printer 30 reads the printing job data stored in the hard disk 32 in sequence and generates the printing request based on this printing job data. When the printer engine is not in use, the printer 30 transmits the printing request to the printer engine to perform printing.

Meanwhile, the printer 30 which has received the printing job which is confidential printing saves its printing job data in the hard disk 32 until a user inputs user information and a password to the printer 30. This state is called a pending state in this embodiment. When the user inputs the user information and the password to the printer 30 in this pending state, the printer 30 reads the printing job data stored in the hard disk 32 and generates a printing request based on this printing job data. When the printer engine is not in use, the printer 30 transmits the printing request to the printer engine to perform printing.

The aforesaid successive processing from the reception of the printing job till the performance of printing is realized by the execution of various programs by the CPU 31a. During this successive processing, the CPU 31a accesses the RAM 31b, the ROM 31c, or the hard disk 32 as necessary. This CPU 31a composes an arithmetic processing unit in this embodiment.

Next, concrete processing when printing is performed in the printing system according to this embodiment will be explained in detail.

Figure 2:
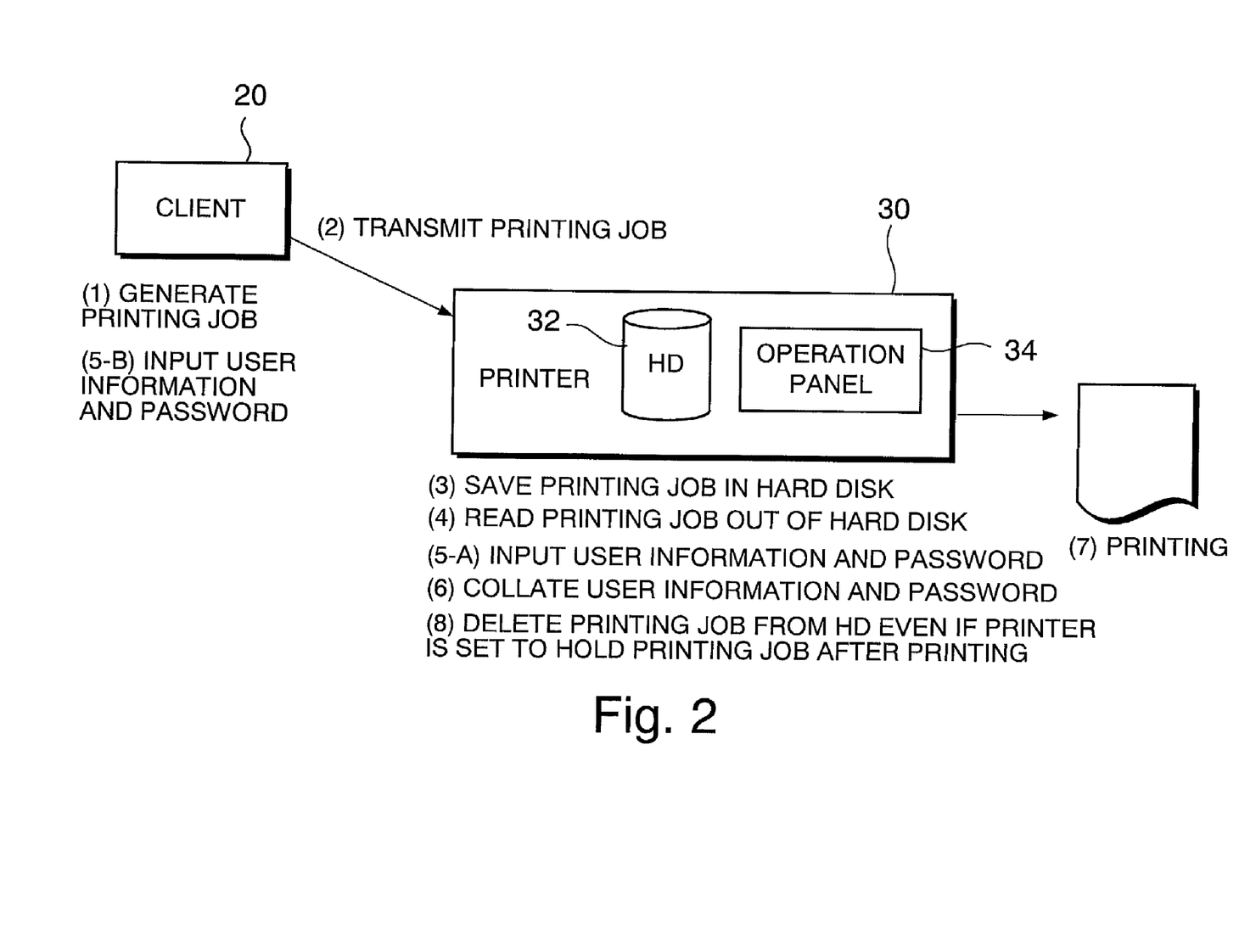
FIG. 2 is a block diagram explaining processing when confidential printing is performed in the printing system according to the first embodiment of the present invention.
Figure 3:
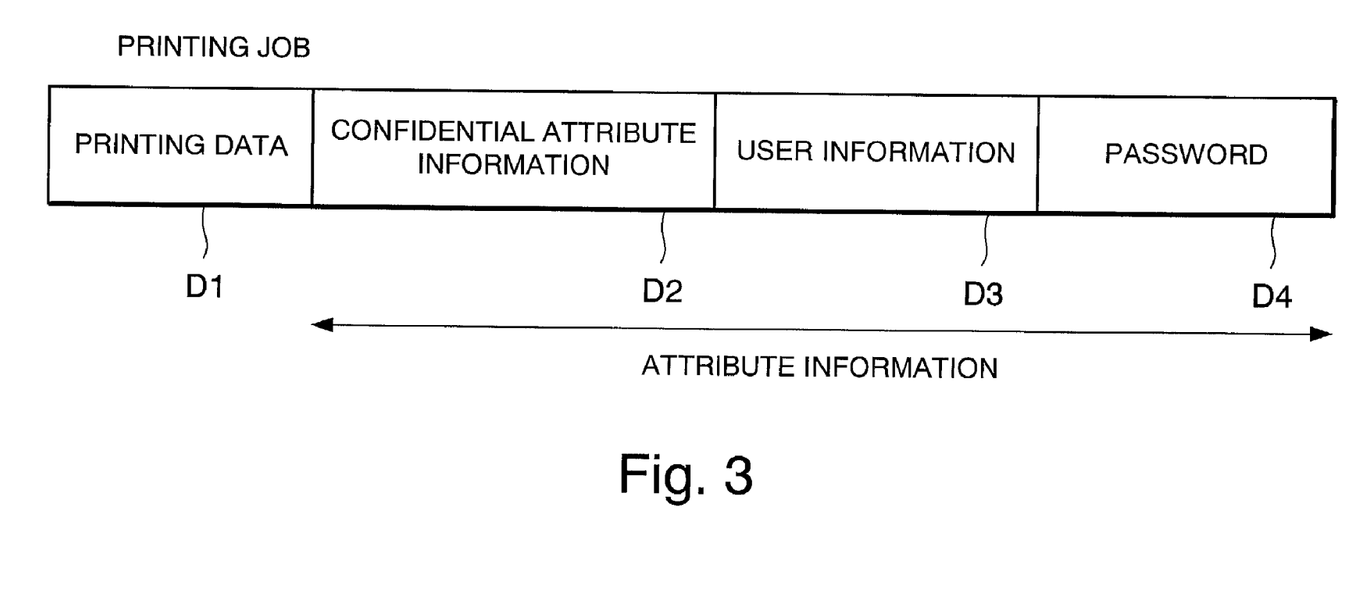
FIG. 3 is a diagram showing an example of a data structure of a printing job to be transmitted from a client to a printer in the printing system according to the first embodiment of the present invention.

FIG. 2 is a block diagram explaining confidential printing processing in the printing system according to this embodiment. As shown in FIG. 2, first of all, (1) the client 20 generates a printing job of confidential printing based on an input instruction from the user. FIG. 3 is a diagram showing a data structure of the printing job of confidential printing according to this embodiment. As shown in FIG. 3, the printing job of confidential printing includes at least printing data D1, confidential attribute information D2, user information D3, and a password D4.

Actual data necessary to cause the printer 30 to drive the printer engine to print it on printing paper are stored in the printing data D1. Information indicating whether the printing job is confidential printing or not is stored in the confidential attribute information D2. Information to identify the user who has made this printing job is stored in the user information D3. In this embodiment, a user ID (ABC123456, for example) is used as the information to identify the user. A password (1234567890XYZ, for example) to be inputted to the printer 30 when the user performs confidential printing is stored in the password D4. This password D4 may be inputted to the client 20 by the user for each printing job, or if it may be registered as the user's own password with the client 20 and it need not be inputted for each printing job.

In this embodiment, attribute information on the printing data D1 is composed of the confidential attribute information D2, the user information D3, and the password D4. Incidentally, when confidential printing is not performed, the user information D3 and the password D4 are not always required. Moreover, the confidential attribute information D2 may be added to the printing data D1 only when confidential printing is performed. In this case, it is possible to omit the confidential attribute information D2, the user information D3, and the password D4 when the printing job is not confidential printing.

Then, as shown in FIG. 2, the client 20 which has generated the printing job of confidential printing (2) transmits this printing job to the printer 30 via the network 10. The printer 30 which has received this printing job (3) stores this printing job as printing job data in the hard disk 32.

Figure 4:
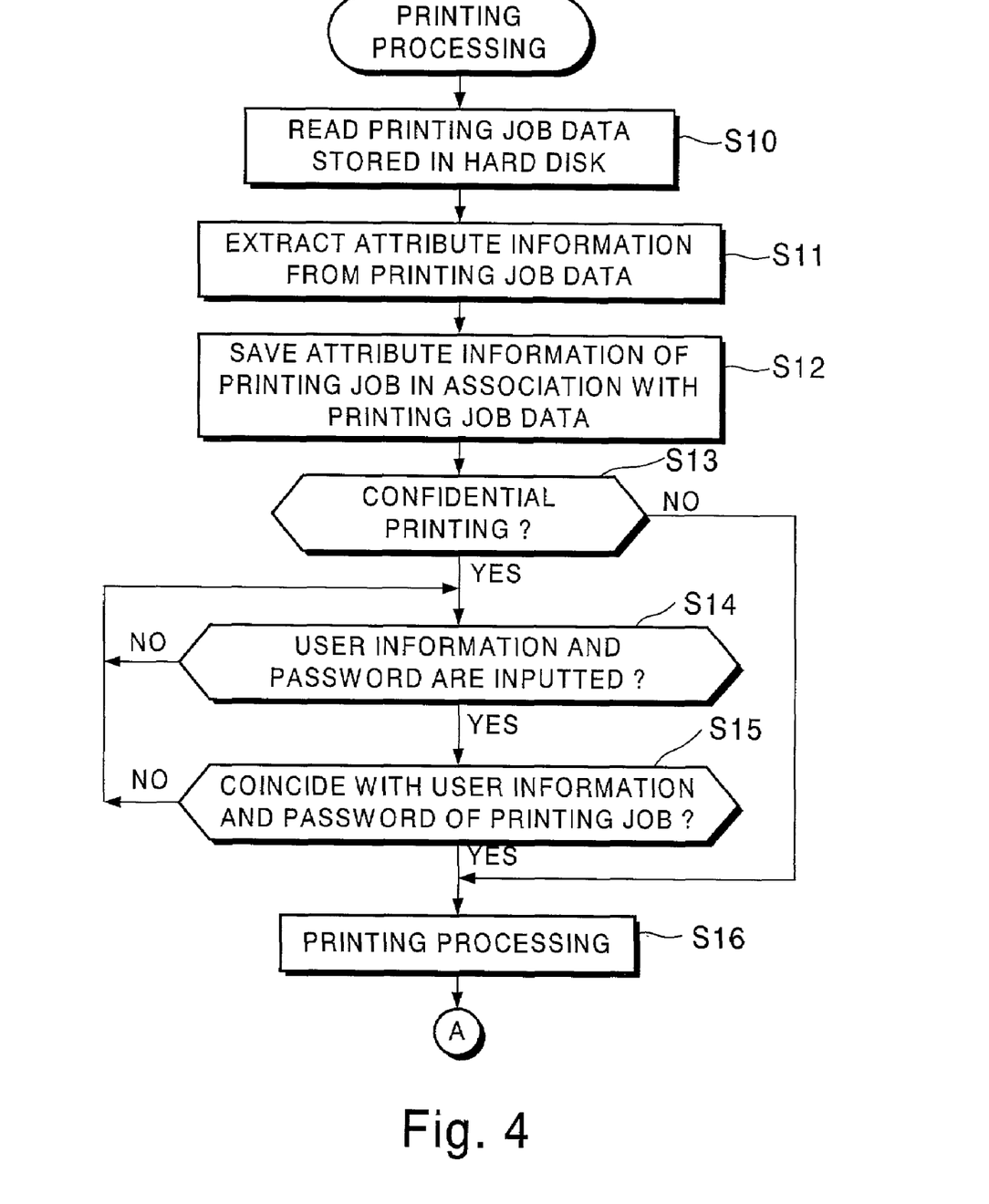
FIG. 4 is a flowchart explaining processing when the printer in the first embodiment of the present invention prints a printing job stored in a hard disk (first processing)
Figure 5:
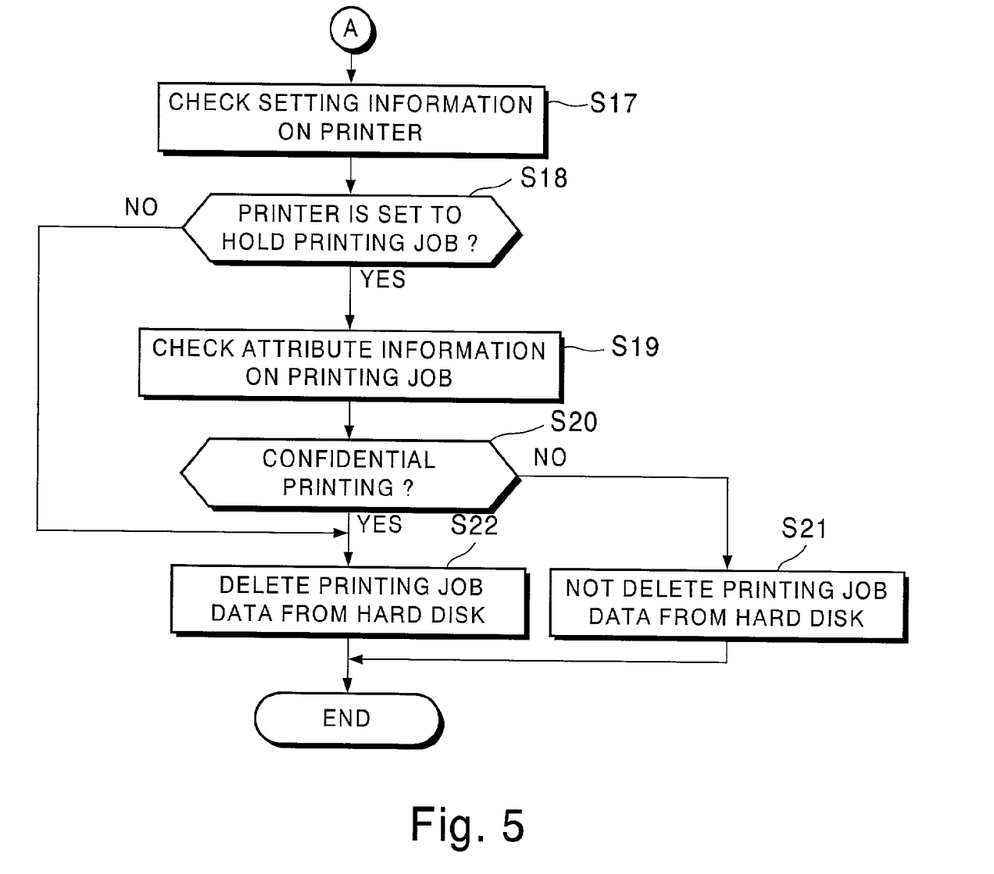
FIG. 5 is a flowchart explaining processing when the printer in the first embodiment of the present invention prints the printing job stored in the hard disk (second processing)

The printer 30 then reads the printing job data stored in the hard disk 32 in proper timing and executes printing processing. FIG. 4 and FIG. 5 are flowcharts explaining the printing processing executed by the printer 30. This printing processing is realized by the execution of printing processing programs stored in the ROM 31c and/or the hard disk 32 by the CPU 31a.

As shown in FIG. 4 and FIG. 2, in predetermined timing, the printer 30 (4) reads the printing job data stored in the hard disk 32 (step S10).

Subsequently, as shown in FIG. 4, the printer 30 extracts and reads attribute information from the read printing job data (step S11). Then, it saves this attribute information in association with the printing job data (step S12). In this embodiment, the attribute information is saved in the RAM 31b provided in the printer 30. The attribute information is previously stored in the RAM 31b in order to eliminate the necessity of reading the printing job data stored in the hard disk 32 in each subsequent processing (for example, step S13 or step S20 described later).

Thereafter, the printer 30 judges whether the printing job is confidential printing or not (step S13). When it is not confidential printing (step S13: No), the procedure jumps to printing processing in step S16 described later. In the case of confidential printing (step S13: Yes), the printer 30 judges whether user information and a password are inputted from the user regarding this printing job (step S14). When the user information and the password are not inputted (step S14: No), the printer 30 stands by while repeating processing in step S14.

Figure 6:
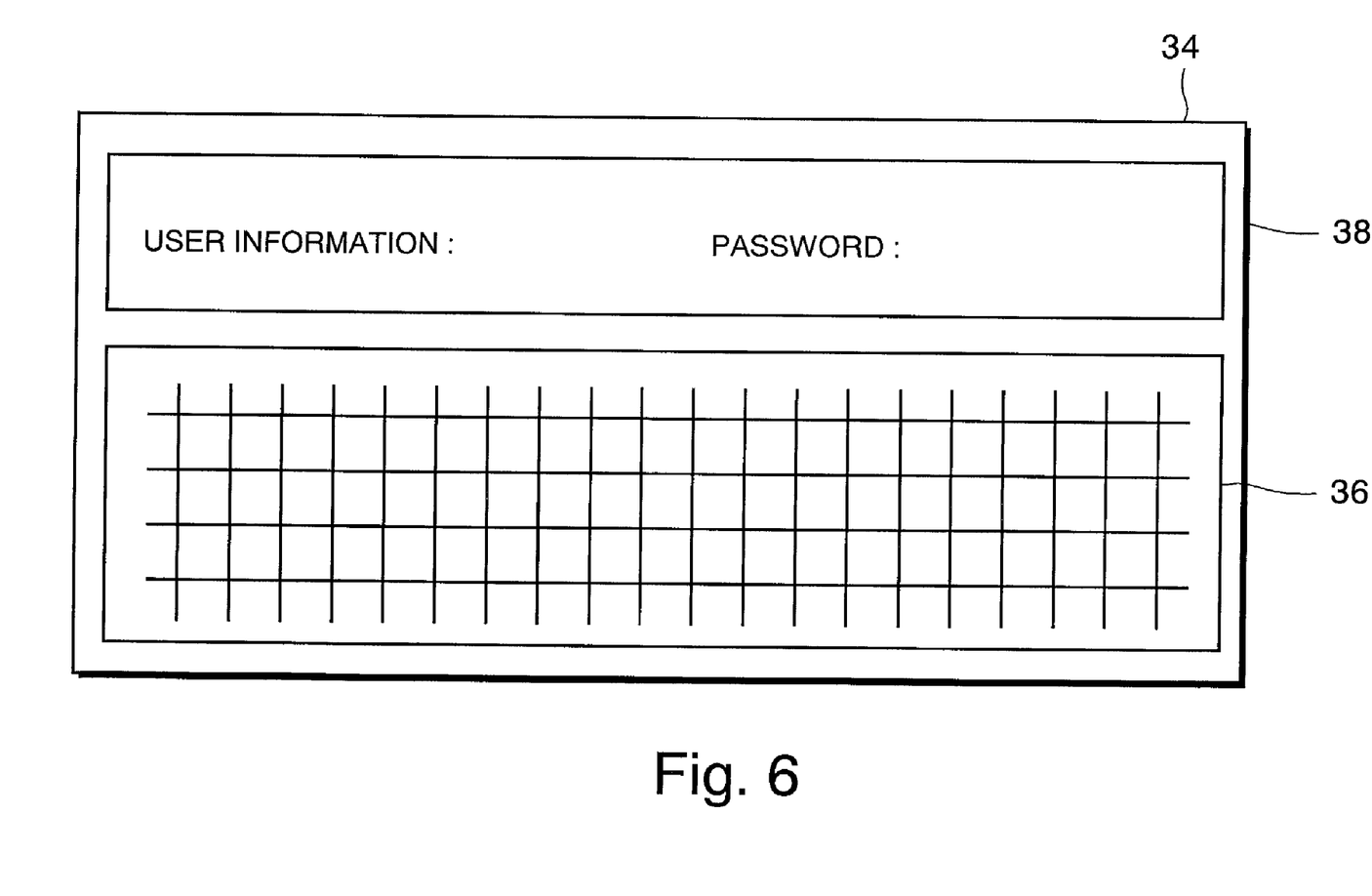
FIG. 6 is a diagram showing an example of an operation panel provided in the printer.

As shown in FIG. 2, in this embodiment, in step S14, the user information and the password are inputted by the user (5-A) from an operation panel 34 provided in the printer 30 or (5-B) from the client 20. FIG. 6 is a diagram showing an example of the operation panel 34 according to this embodiment. As shown in FIG. 6, the user operates input keys 36 displayed on the operation panel 34 provided in the printer 30 to input the user information and the password to an input field 38.

On the other hand, when these user information and password are inputted from the client 20, the user inputs these user information and password from an input unit of the client 20 and transmits them to the printer 30 via the network 10.

Incidentally, in both the cases, if the user inputs the password after specifying a printing job, it is possible to omit the input of the user information since the printing job includes the user information.

Next, as shown in FIG. 2 and FIG. 4, when the user information and the password are inputted (step S14: Yes), (6) the printer judges whether these inputted user information and password coincide with the user information D3 and the password D4 included in the printing job (step S15).

As shown in FIG. 4, when the inputted user information and password do not coincide with the user information D3 and the password D4 included in the printing job (step S15: No), the printer returns to the aforesaid step S14 and stands by.

When they coincide (step S15: Yes) and when it is judged that the printing job is not confidential printing in the aforesaid step S13 (step S13: No), (7) actual printing processing is performed (step S16) also as shown in FIG. 2. More specifically, the printer 30 performs language interpretation based on the printing data D1 in the printing job to generate a printing request, and then transmits this generated printing request to the printer engine when the printer engine is not in use to print printing paper.

Thereafter, as shown in FIG. 5, the printer 30 checks setting information on this printer itself (step S17). Based on this setting information, the printer 30 judges whether the printer 30 is set to hold the printing job in the hard disk 32 after printing (step S18). Namely, the printer 30 according to this embodiment can be set to still hold or not to hold the printing job data in the hard disk 32 after printing, not for each printing job but comprehensively.

When being set to hold the printing job in the hard disk 32 after printing (step S18: Yes), the printer checks attribute information on the printing job (step S19) and judges whether the printing job is confidential printing or not (step S20). When it is not confidential printing (step S20: No), the printing job data are not deleted from the hard disk 32 (step S21) at this point. Specifically, the status of the printing job data stored in the hard disk 32 is changed from the pending state in which printing is not started to a holding state in which printing is completed. Then, the printing processing is completed.

Meanwhile, when the printer judges that the printing job is confidential printing (step S20: Yes) and when it judges that the printer is not set to hold the printing job after printing in the aforesaid step S18 (step S18:No), (8) the printing job data stored in the hard disk 32 are deleted (step S22) as shown in FIG. 2. Then, the printing processing is completed.

As described above, according to the printing system in this embodiment, in the case of confidential printing which is a kind of printing of secret documents, even if the printer 30 is set to hold printing job data after printing, the printing job data are deleted without being held in the hard disk 32 after printing, whereby the secrecy of confidential printing can be heightened. Namely, the occurrence of a possibility that when the printer 30 is set to hold the printing job data in the hard disk 32 after printing as in related arts, the printing job data is still held in the hard disk 32 and as a result some dishonest person looks surreptitiously at the contents held in the hard disk 32 can be avoided.

Moreover, by only changing the status of the printing job data stored in the hard disk 32 from the pending state to the holding state, the processing to hold the printing job data in the hard disk 32 after printing can be performed, whereby its processing time can be reduced to the shortest possible time.

[Second Embodiment]

In the second embodiment of the present invention, a directory server 40 which manages user information and passwords all over the network is provided in the aforesaid first embodiment, and when the user inputs user information and a password to the printer 30, the printer 30 requests their collation from the directory server 40 and performs confidential printing when the result of the collation indicates coincidence. This will be explained below in more detail.

Figure 7:
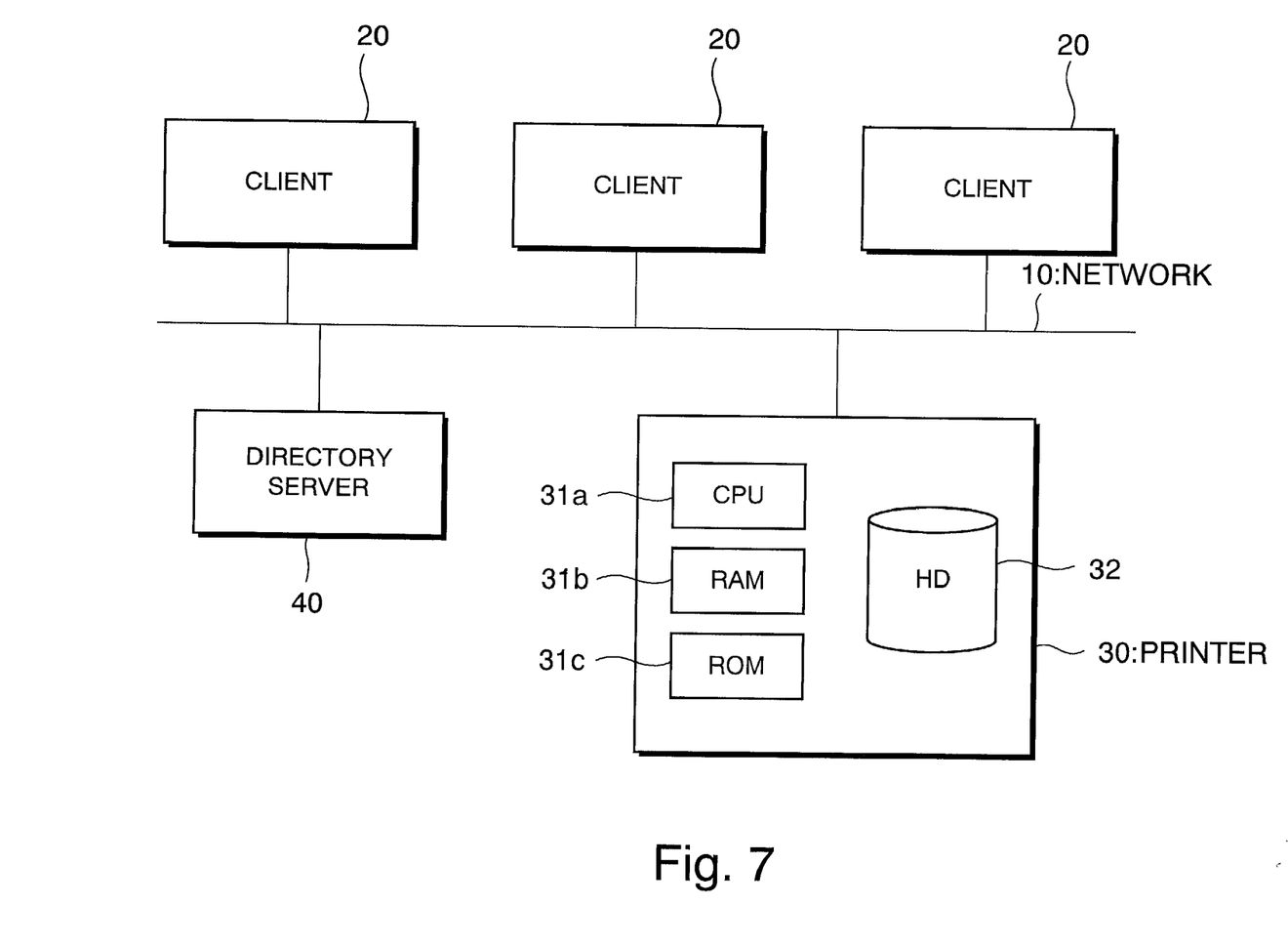
FIG. 7 is a diagram showing an example of a hardware configuration of a printing system according to a second embodiment of the present invention.

First, the configuration of a printing system according to this embodiment will be explained based on FIG. 7. FIG. 7 is a block diagram showing a hardware configuration of the printing system according to this embodiment.

As shown in FIG. 7, the printing system according to the second embodiment is configured by adding the directory server 40 to the printing system of the aforesaid first embodiment. Namely, the printing system according to this embodiment comprises a plurality of clients 20, 20, and 20 connected to the network 10, one printer 30 also connected to the network 10, and one directory server 40 also connected to the network. The directory server 40 is a system which collectively manages user information and passwords of users who utilize this network 10. In other words, in this embodiment, passwords are set for respective users all over the network but not set for individual printing jobs. Accordingly, when user information and a password are inputted to the printer 30, the printer 30 requests their collation from the directory server 40. The configuration except this is the same as that of the aforesaid first embodiment.

Next, processing when printing is performed in the printing system according to this embodiment will be explained in detail.

Figure 8:
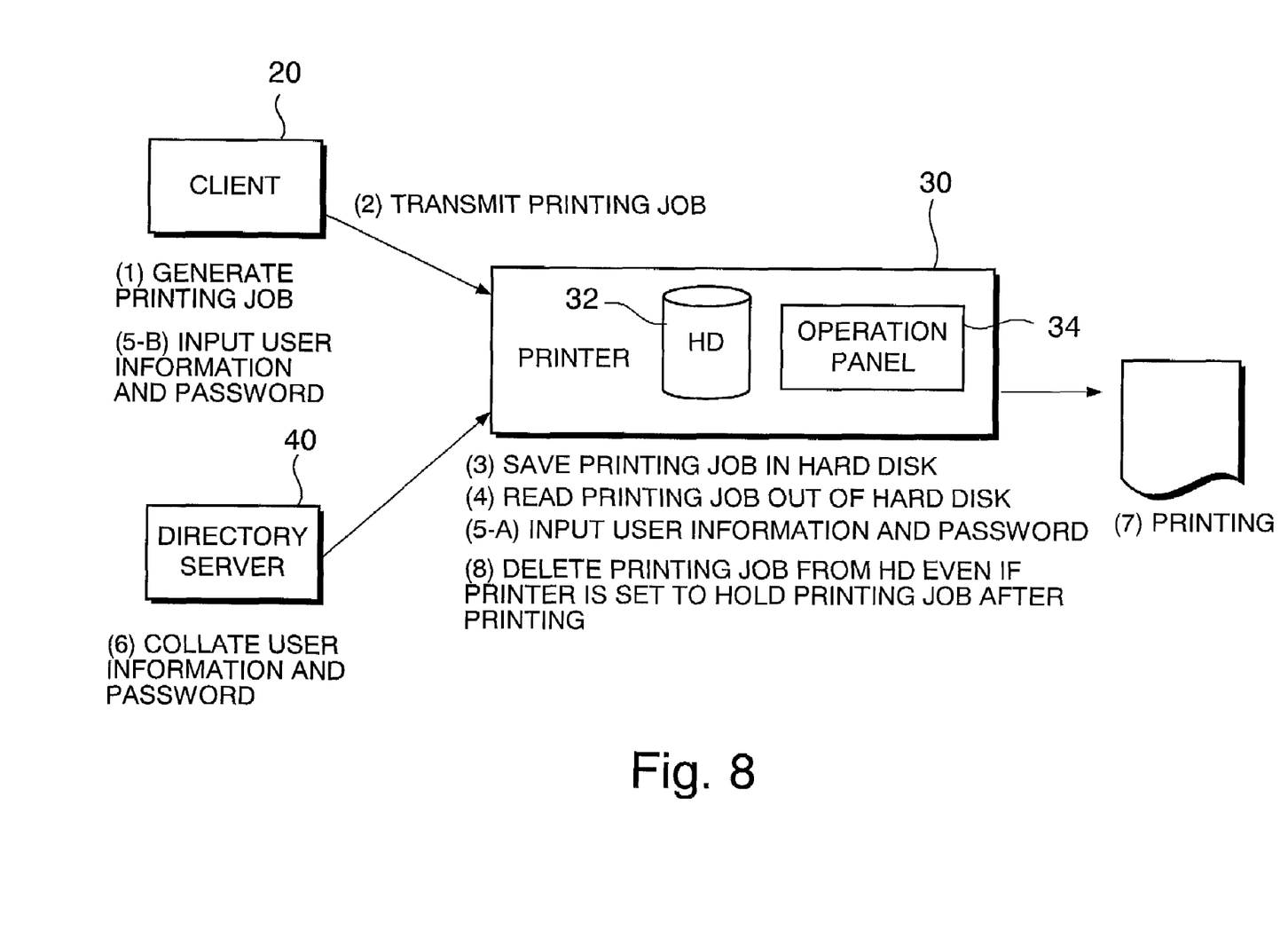
FIG. 8 is a block diagram explaining processing when confidential printing is performed in the printing system according to the second embodiment of the present invention.
Figure 9:
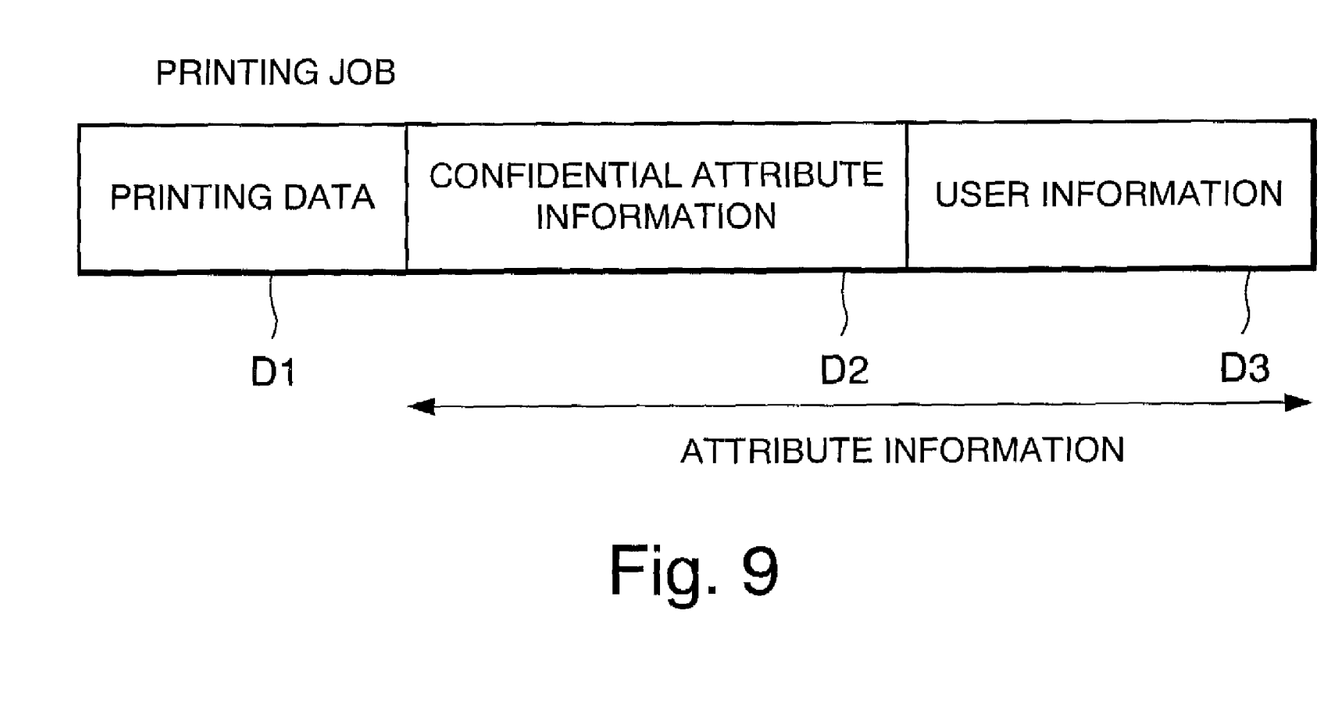
FIG. 9 is a diagram showing an example of a data structure of a printing job to be transmitted from a client to a printer in the printing system according to the second embodiment of the present invention.

FIG. 8 is a block diagram explaining processing of confidential printing in the printing system according to this embodiment. As shown in FIG. 8, first of all, (1) the client 20 generates a printing job of confidential printing based on an input instruction from the user. FIG. 9 is a diagram showing a data structure of the printing job of confidential printing according to this embodiment. As shown in FIG. 9, in the printing job of confidential printing in the second embodiment, the password D4 is omitted as compared with the printing job of confidential printing in the aforesaid first embodiment (See FIG. 3). Namely, the printing job in the second embodiment includes at least the printing data D1, the confidential attribute information D2, and the user information D3.

In this embodiment, attribute information on the printing data D1 is composed of the confidential attribute information D2 and the user information D3. Incidentally, when confidential printing is not performed, the user information D3 is not always required. Moreover, the confidential attribute information D2 may be added to the printing data D1 only when confidential printing is performed. In this case, it is possible to omit the confidential attribute information D2 and the user information D3 when the printing job is not confidential printing.

Then, as shown in FIG. 8, the client 20 which has generated the printing job of confidential printing (2) transmits this printing job to the printer 30 via the network 10. The printer 30 which has received this printing job (3) stores this printing job as printing job data in the hard disk 32.

Figure 10:
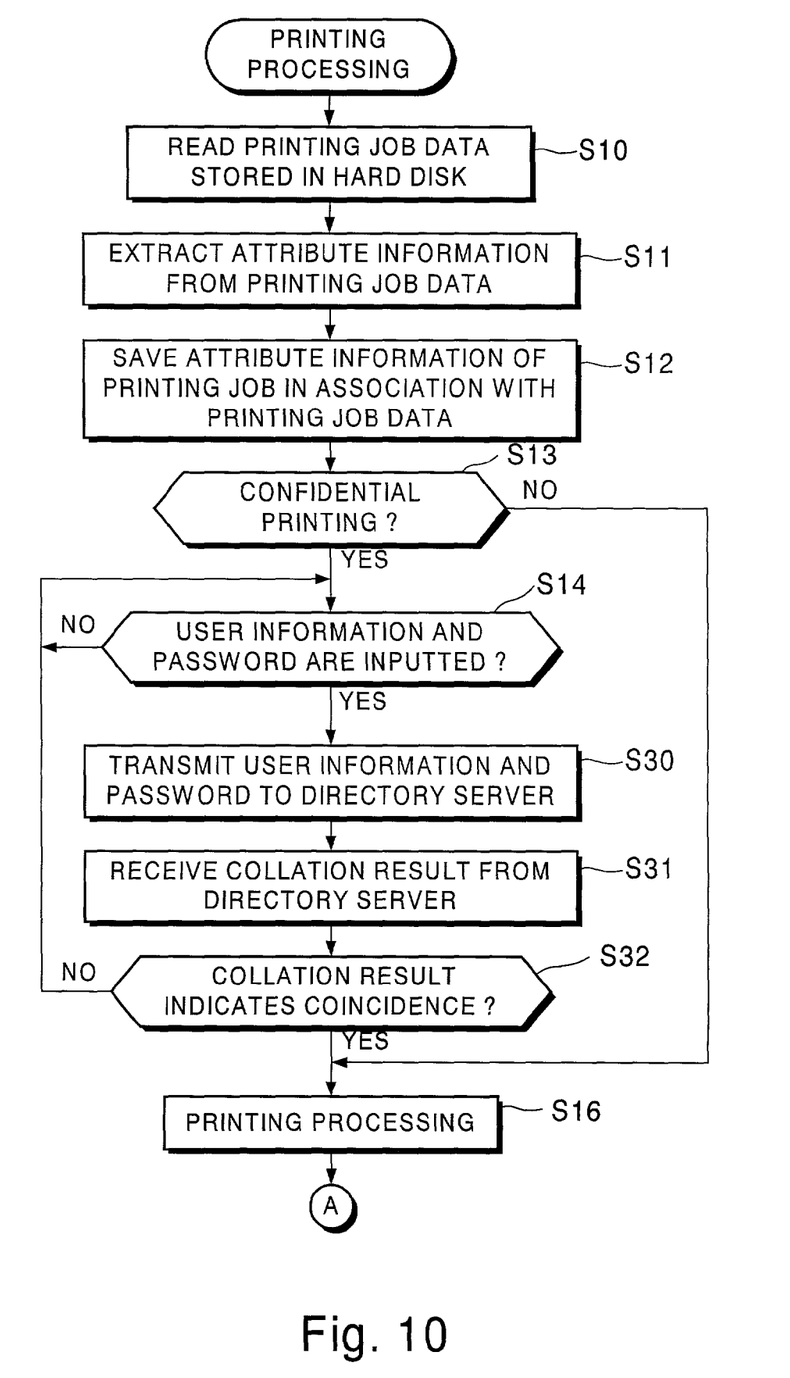
FIG. 10 is a flowchart explaining processing when the printer in the second embodiment of the present invention prints a printing job stored in a hard disk (which corresponds to FIG. 4)

The printer 30 then reads the printing job data stored in the hard disk 32 in proper timing and executes printing processing. FIG. 10 is a flowchart explaining a part of the printing processing executed by the printer 30 and corresponds to FIG. 4 in the first embodiment. This printing processing is also realized by the execution of printing processing programs stored in the ROM 31c and/or the hard disk 32 by the CPU 31a. Processing after FIG. 10 is the same as that in FIG. 5 in the aforesaid first embodiment and thus the explanation thereof is omitted.

In the explanation of only points different from the aforesaid first embodiment, when user information and a password are inputted in step S14 (step S14: Yes), the printer 30 transmits the inputted user information and password to the directory server 40 (step S30). Incidentally, when the input of user information is omitted, the printer 30 transmits user information included in the printing job and a password inputted at this point by the user to the directory server 40 via the network 10.

As shown in FIG. 8, (6) the directory server 40 which has received these user information and password judges whether user information registered in advance in a user table provided in this directory server 40 and a password registered corresponding to this user information coincide with the user information and the password received this time. When they coincide, the directory server 40 transmits a collation result indicating that they coincide to the printer 30, and when they do not coincide, it transmits a collation result indicating that they do not coincide to the printer 30.

As shown in FIG. 10, the printer 30 receives this collation result via the network 10 (step 31). Then, it judges whether the collation result indicates that the user information and the password inputted by the user coincide with the user information registered with the directory server 40 and the password registered corresponding to this user information (step S32).

When the collation result indicates that they do not coincide (step S32: No), the printer 30 returns to the aforesaid step S14 and stands by until user information and a password are inputted again. Meanwhile, when the collation result indicates that they coincide (step S32: Yes) and when it is judged that the printing job is not confidential printing in the aforesaid step S13 (step S13: No), (7) actual printing processing is performed (step S16) as shown in FIG. 8.

Processing after this is the same as that in the aforesaid first embodiment, and hence the detailed explanation thereof is omitted here.

As described above, according to the printing system related to this embodiment, in the case of confidential printing which is a kind of printing of secret documents, even if the printer 30 is set to hold printing job data after printing, the printing job data are deleted without being held in the hard disk 32 after printing, whereby the secrecy of confidential printing can be heightened. Namely, the occurrence of a possibility that when the printer 30 is set to hold the printing job data in the hard disk 32 after printing as in the related arts, the printing job data is still held in the hard disk 32 and as a result some dishonest person looks surreptitiously at the contents held in the hard disk 32 can be avoided.

[Third Embodiment]

Next, a method of performing the comprehensive setting of a hold function and the setting of confidential printing of the printer 30 according to the aforesaid first embodiment and second embodiment from the client 20 will be explained as the third embodiment.

As stated above, the printer 30 according to the first embodiment and the second embodiment can be set to hold or not to hold the printing job data in the hard disk 32 after printing, not for each printing job but comprehensively. This setting of the hold function is stored in the RAM 31b provided in the printer 30.

This setting of the hold function can be performed by the user from the operation panel 34 shown in FIG. 2. Specifically, the user can comprehensively set whether the printing job data is held or not after printing by operating the operation panel 34. Namely, whether the printing job data is held in the hard disk 32 or not can be set as the setting of the hold function of the printer 30 itself.

Figure 11:
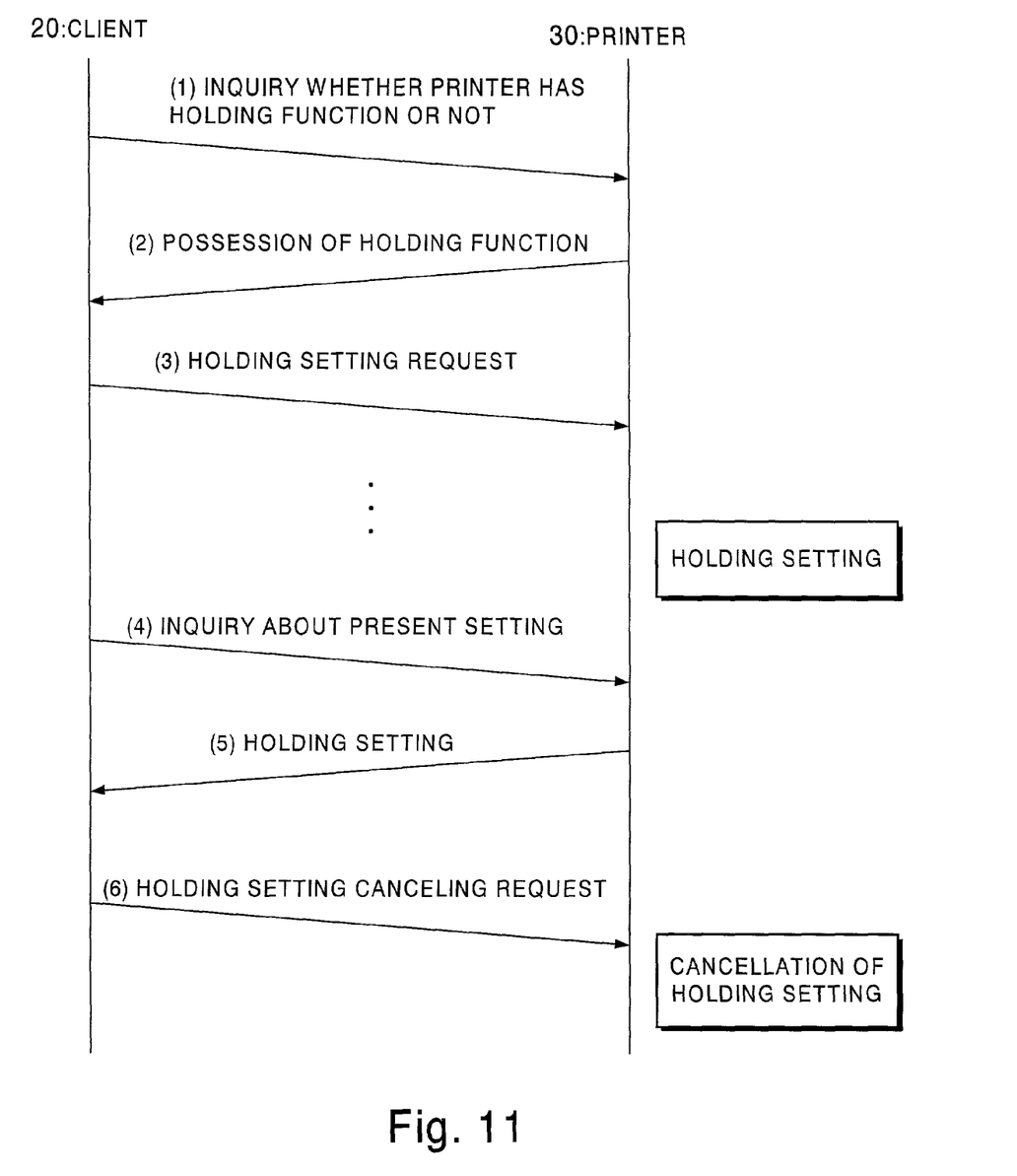
FIG. 11 is a timing chart when a hold function of each printer of the first embodiment and the second embodiment of the present invention is set from the client (a third embodiment)

This setting of the hold function can be performed also from the client 20. FIG. 11 is a timing chart showing the transmission and reception of signals between the client 20 and the printer 30 when the hold function is set from one of the clients 20. Shown in this case is the timing chart when the user operates the client 20 to set the hold function of holding the printing job data after printing, and thereafter to cancel the setting of the hold function.

First, the user operates the client 20 and instructs it to set the printer 30 to hold the printing job data after printing. The client 20 which has received this instruction (1) inquires of the printer 30 whether the printer 30 has the hold function of holding the printing job data after printing via the network 10. The printer 30 which has received this inquiry replies whether it has the hold function or not. Since the printer 30 has the hold function in the example in FIG. 11, (2) it transmits a replay to the effect that it has the hold function to the client 20.

The client 20 which has received the replay to the effect that the printer has the hold function (3) transmits a hold setting request to the printer 30 so that the printing job data are comprehensively held in the hard disk 32 after printing. In the printer 30 which has received this hold setting request, the hold function is set to hold setting. Thus, the printer 30 is set in principle to hold the printing job data in the hard disk 32 after printing.

When the user cancels this hold setting, the user first operates the client 20 and instructs it to check the present setting of the hold function of the printer 30. The client 20 which has received this instruction (4) inquires of the printer 30 about the present setting of the hold function. The printer 30 which has received this inquiry replays the present setting of the hold function to the client 20. Since the printer 30 is set to hold the printing job data after printing in this case, the printer 30 (5) transmits a reply to the effect that the hold function is set to hold setting to the client 20.

The user which has received this replay operates the client 20 and (6) transmits a hold setting canceling request to the printer 30 from the client 20 so that the hold setting of the printer 30 is cancelled. The printer 30 which has received this hold setting canceling request cancels the hold setting and is set not to hold the printing job data in the hard disk 32 after printing, not for each printing job but comprehensively.

Meanwhile, in the printer 30 according to the aforesaid first embodiment and second embodiment, it is possible to set whether to perform or not to perform confidential printing for each connection between the client 20 and the printer 30. Namely, whether printing job is performed or not is set for each printing job in the aforesaid first embodiment and second embodiment, but this setting can be also performed for each connection which is established between the client 20 and the printer 30.

Figure 12:
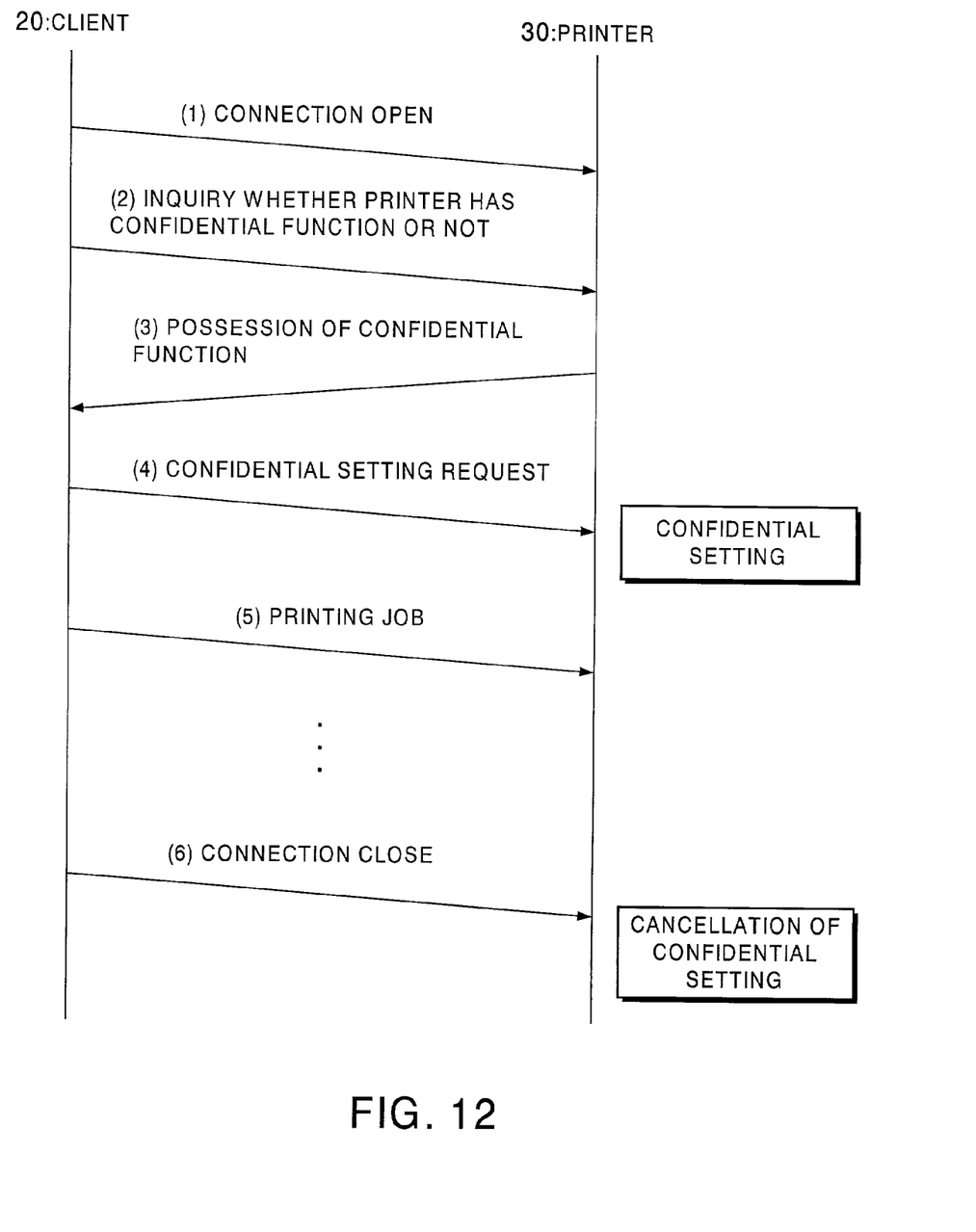
FIG. 12 is a timing chart when confidential printing of each printer of the first embodiment and the second embodiment of the present invention is set for each connection (the third embodiment).

FIG. 12 is a timing chart showing the transmission and reception of signals between the client 20 and the printer 30 when confidential printing is set for each connection. As shown in FIG. 12, the client 20 (1) opens a connection between the printer 30 and the client 20 itself via the network 10. Subsequently, in order to confirm whether the printer 30 has a confidential printing function or not, the client 20 (2) inquires of the printer 30 whether the printer 30 has the confidential function or not. The printer 30 which has received this inquiry transmits a replay whether it has the confidential printing function or not. Since the printer 30 has the confidential printing function in this case, (3) it transmits a replay to the effect that it has the confidential printing function to the client 20.

The client 20 which has received the replay to the effect that the printer has the confidential printing function (4) transmits a confidential setting request to the printer 30 in order to perform confidential printing for this connection. In the printer 30 which has received this confidential setting request, a printing job received in this connection is set to confidential printing. Thereafter, (5) the client 20 transmits a printing job to the printer 30, and the printer 30 deals with this printing job as confidential printing even if this printing job is not set to confidential printing. The number of printing jobs transmitted form the client 20 is not limited to one, and a plurality of printing jobs are transmitted in some cases.

The client 20 which finished transmitting a series of printing jobs (6) closes the connection between the printer 30 and the client 20. When the connection is closed, this setting of confidential printing between the client 20 and the printer 30 is canceled.

Confidential printing for each connection is set between each of the clients 20 and the printer 30. Hence, even if confidential printing is set for a connection between one of the clients 20 and the printer 30, this setting of the confidential printing exerts no influence on printing jobs transmitted from the other clients 20 to the printer 30.

As described above, according to the printer 30 related to this embodiment, whether printing job data is held in the hard disk 32 after printing or not can be set not for each of printing jobs but comprehensively, not only from the printer 30 but also from the client 20. Consequently, more convenience can be given to the user.

Moreover, according to the printer 30 related to this embodiment, confidential printing can be set for each of connections established between the clients 20 and the printer 30, and hence the user need not set confidential printing for each of printing jobs. Consequently, more convenience can be given to the user.

It should be noted that the present invention is not limited to the aforesaid embodiments and can be modified variously. For example, although whether a printing job has some secret or not is judged by the printer 30 by confirming whether the printing job is a confidential printing or not in the aforesaid embodiments, it may be judged by using other viewpoints. For example, in the case of a printing job in which printing is started only when a right password is inputted from the user when the printer 30 receives the printing job, it may be suitable to judge that this printing job has some secret.

The printer 30 according to the aforesaid embodiments has the function of selectively setting whether to hold or not to hold the printing job in the hard disk 32 after printing, but this selective setting function is not always necessary. Namely, the present invention can be applied also to the printer 30 which does not have such a selective setting function and holds the printing job in the hard disk after printing as the printer's own non-selective function.

Further, although the received printing job is temporarily stored as printing job data in the hard disk 32 before printing in the aforesaid embodiments, the printing job data need not be always stored in the hard disk 32 before printing. In this case, it is recommended that when the printing job which is not confidential printing is received, printing be performed with the printer engine driven, and that when the printing job which is confidential printing is received, the printing job be stored as printing job data in a memory or be stored as printing job data in the hard disk 32 only in this case.

As for each processing explained in each of the aforesaid embodiments, it is possible to record a program to execute each processing on a record medium such as a floppy disk, a CD-ROM (Compact Disc-Read Only Memory), a ROM, a memory card, or the like and distribute this program in the form of the record medium. In this case, the aforesaid embodiments can be realized by making the client 20, the printer 30, and/or the directory server 40 read the record medium on which this program is recorded and execute this program.

The client 20, the printer 30, and/or the directory server 40 sometimes has other programs such as an operating system, other application programs, and the like. In this case, by using these other programs, such a command as calls a program to realize processing equal to that in the aforesaid embodiments out of programs in the printer 30 may be recorded on the record medium.

Further, such a program can be distributed not in the form of the record medium but in the form of a carrier wave via a public network. The program transmitted in the form of the carrier wave over the public network is incorporated in the client 20, the printer 30, and/or the directory server 40 as required, and the aforesaid embodiments can be realized by executing this program.

Furthermore, when being recorded on the record medium or transmitted as the carrier wave over the public network, the program is sometimes encoded or compressed. In this case, the client 20, the printer 30, and/or the directory server 40 which has read the program out of the record medium or the carrier wave needs to execute the program after decoding or expanding it.

As explained above, according to the printer related to the aforesaid embodiments, even in the case of a printer having the function of holding printing jobs in an auxiliary memory device after printing, a printing job having some secret is not held in the auxiliary memory device after printing, whereby the secrecy of the printing job can be heightened.

What is claimed is:

1. A print system comprising:
at least one printer; and
at least one client connected to the printer via a network,
wherein the client comprises
a printing job generator which generates a printing job of confidential printing based on an input instruction from a user; and
a printing job transmitter which transmits the printing job to the printer via the network,
wherein the printer comprises
a printing job receiver which receives the printing job from the client via the network;
a storing executor which temporarily stores the received printing job as printing job data in an auxiliary memory device;
a reader which reads the printing job data from the auxiliary memory device;
a print executor which executes printing operation based on the printing job data read by the reader;
a set portion in which whether or not the received printing job is held as printing job data in an auxiliary memory device even after printing of the received printing job is completed is set not for each printing job but comprehensively;

a judging portion which judges whether or not the received print job is of the confidential printing; and a selective deleter which deletes the printing job data from the auxiliary memory device after the printing operation is completed if the judging portion judges that the printing job is of the confidential printing, even when the set portion is set so that the printing job is still held as the printing job data in the auxiliary memory device even after printing of the received printing job is completed.

2. The print system according to claim 1, wherein the selective deleter does not delete the printing job data from the auxiliary memory device after the printing operation is completed if the judging portion judges that the printing job is not of the confidential printing, when the set portion is set so that the printing job is still held as the printing job data in the auxiliary memory device even after printing of the received printing job is completed.

3. The print system according to claim 2 further comprising a status changer which changes a status of the printing job data stored in the auxiliary memory device before printing to the status indicating that the printing job data should be held after the printing operation, if the printing job should be held as printing job data in the auxiliary memory device after the printing operation is completed.

4. The print system according to claim 3, wherein the set portion is allowed from the client via the network to be set comprehensively so that the received printing job is held as the printing job data in the auxiliary memory device even after printing of the received print job is completed.

5. The print system according to claim 4, wherein the auxiliary memory device is a hard disk drive in the printer.

6. The print system according to claim 4, wherein the confidential printing is set for each printing job.

7. The print system according to claim 4, wherein the confidential printing is set for each connection established between the printer and the client.

8. A method for controlling a print system including at least one printer and at least one client connected to the printer via a network, the printer including a set portion in which whether or not a received printing job is held as printing job data in an auxiliary memory device even after printing of the received printing job is completed is set not for each printing job but comprehensively, comprising the steps of:

generating a printing job of confidential printing based on an input instruction from a user in the client;

transmitting the printing job from the client to the printer via the network;

receiving the printing job from the client via the network in the printer;

temporarily storing the received printing job as printing job data in the auxiliary memory device in the printer;

reading the printing job data from the auxiliary memory device;

executing printing operation in the printer based on the printing job data;

judging whether or not the received print job is of the confidential printing in the printer; and deleting the printing job data from the auxiliary memory device after the printing operation is completed if it is judged that the printing job is of the confidential printing, even when the set portion is set so that the printing job is still held as the printing job data in the auxiliary memory device even after printing of the received printing job is completed.

9. The method according to claim 8, wherein the printing job data in the auxiliary memory device is not deleted after the printing operation is completed if it is judged that the printing job is not of the confidential printing, when the set portion is set so that the printing job is still held as the printing job data in the auxiliary memory device even after printing of the received printing job is completed.

10. The method according to claim 9 further comprising the step of changing a status of the printing job data stored in the auxiliary memory device before printing to the status indicating that the printing job data should be held after the printing operation, if the printing job should be held as printing job data in the auxiliary memory device after the printing operation is completed.

11. The method according to claim 10, wherein the set portion is allowed from the client via the network to be set comprehensively so that the received printing job is held as the printing job data in the auxiliary memory device even after printing of the received print job is completed.

12. The method according to claim 11, wherein the auxiliary memory device is a hard disk drive in the printer.

13. The method according to claim 11, wherein the confidential printing is set for each printing job.

14. The method according to claim 11, wherein the confidential printing is set for each connection established between the printer and the client.

* * * * *